UNITED STATES PATENT OFFICE.

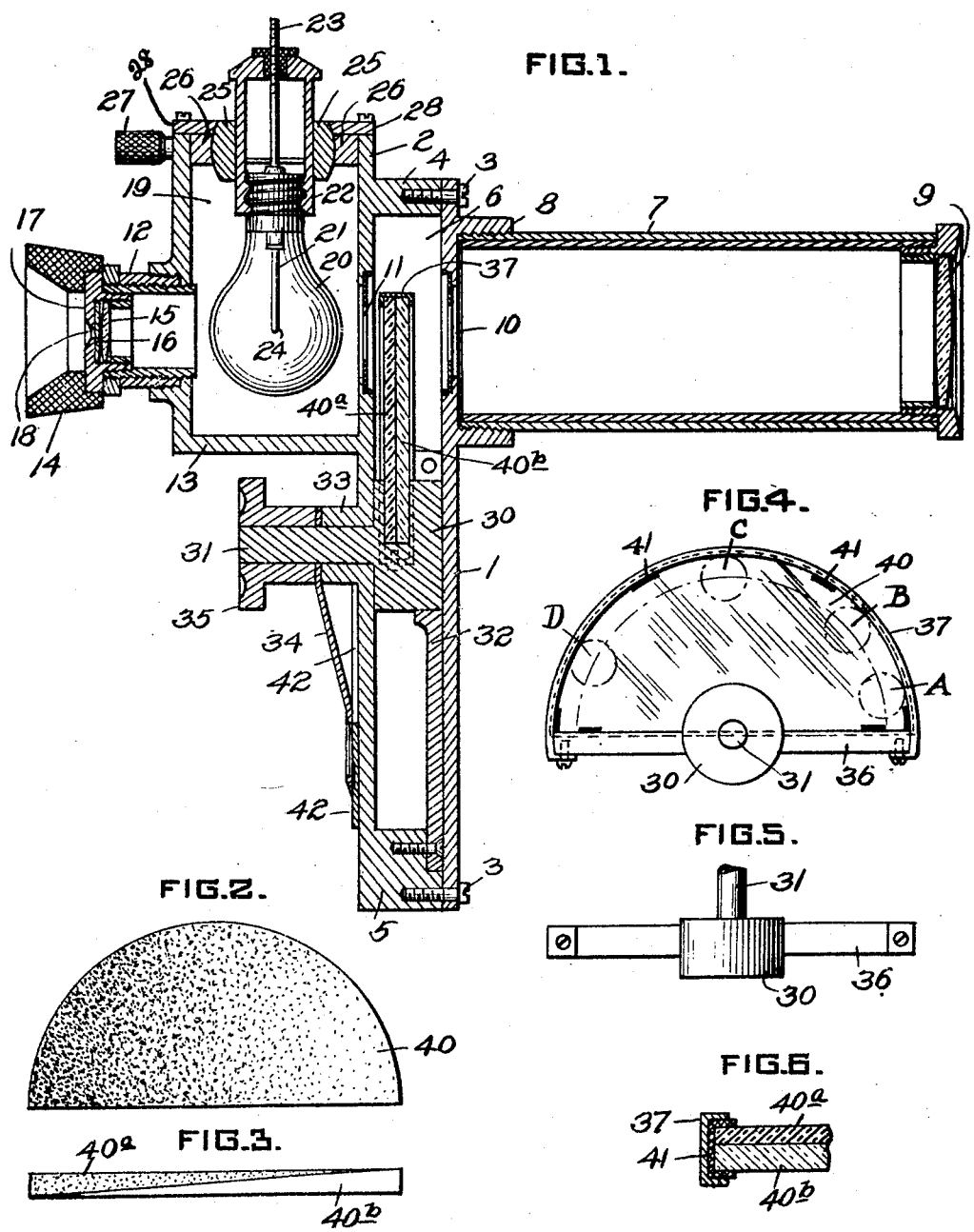

EDWIN H. FISHER, OF PITTSBURGH, PENNSYLVANIA, ASSIGNOR TO SCIENTIFIC MATERIALS COMPANY, A CORPORATION OF PENNSYLVANIA.

ABSORPTION WEDGE.

1,419,725.

Specification of Letters Patent. Patented June 13, 1922.

Application filed April 12, 1920. Serial No. 373,136.

*To all whom it may concern:*

Be it known that I, EDWIN H. FISHER, a resident of Pittsburgh, in the county of Allegheny and State of Pennsylvania, have invented a new and useful Improvement in Absorption Wedges, of which the following is a specification.

This invention relates to optical pyrometers, and other instruments for comparing light intensities.

The object of the invention is to provide a novel absorption wedge for reducing the intensity of a beam of light. More particularly the invention consists in providing such an absorption wedge of a novel form and construction.

Referring to the drawings Fig. 1 is a vertical longitudinal central section through an optical pyrometer equipped with this invention; Fig. 2 is an elevation of the absorption wedge therefor; Fig. 3 is a plan view of the wedge; Fig. 4 is a partial section showing the mounting of the wedge; Fig. 5 is an underplan view of the parts shown in Fig. 4; and Fig. 6 is an enlarged partial section showing the method of mounting the wedge in its frame.

The principles of optical pyrometers are well known. When certain materials are heated to incandescence, the intensity of the light given off varies with the temperature of the object. Therefore, by measuring the intensity of light emitted, the temperature may be accurately determined of an object which is too hot to be approached nearly enough for measurement by direct temperature effects. The principle of such instruments is the comparison of light received from the heated object with light of a constant predetermined intensity. When the light received from the object is of the same intensity as that of the light from the fixed source, the object is known to be of a certain heat. By applying a color, or absorption screen, to reduce the intensity of light received from the object to bring it to the same intensity as that of the constant source, or vice versa, and measuring the amount of such reduction, the temperature of the object may be very accurately determined, by measuring the amount which the light has to be reduced. This latter is of course easily done.

Heretofore optical pyrometers have been invented in which a source of illumination of constant intensity is placed directly in the axis of a telescope barrel, which is pointed at the object of which the heat is to be measured, and a variable absorption member has been provided in the telescope barrel between the fixed light and the heated object, so that by varying the absorption member, the light from the object is gradually reduced to the same intensity as that of the fixed source. The latter is ordinarily a lamp filament. By measuring the amount of reduction necessary, the heat of the incandescent object is determined.

This invention relates to that type of pyrometers. It contemplates a circular wedge, and the construction and mounting of such a member form the subject matter of this invention.

An instrument embodying this invention is shown in the drawings, wherein a suitable frame member 1 is provided. This may be carried by any suitable form of support, not here shown. This frame member is in the form of a metal plate to which is attached another metal plate 2, the two plates being connected by screws 3, and forming by means of flanges 4 and 5 a chamber 6, in which is mounted the movable absorption screen, or wedge, below described. A telescope barrel 7 is threaded into a projection 8 of the frame member 1. This barrel carries a terminal lens 9, suitably mounted therein. An opening 10 is provided through the frame member 1. This opening is circular, concentrically aligned in the axis of the telescope with the lens 9, and also with a similar opening 11 through the frame member 2, and with a supplementary barrel 12, attached to an extension 13 of the frame member 2. This supplementary barrel 12 has a terminal eye piece 14, in which is mounted a lens 15, a colored screen 16, and an opaque screen 17 through which is provided a small observing opening 18, the center of which is in the axis of the two telescope barrels. That is, the openings 10, 11, 18, and lenses 9 and 15 all have their centers in the axis of the telescope. The extension 13 of the frame member 2 provides an enlarged chamber 19 in which is situated an incandescent electric lamp comprising a globe 20, filament 21, socket 22, and lead wires 23. The filament 21 is made so that only its end portion becomes incandescent when current is flowing there-through, and this end portion 24 is situated at the axis of the telescope, and therefore directly in the beam of light which is received through the lens 9 and transmitted through the opening 18. Therefore this incandescent portion of the filament 24 is situated directly in the image viewed by the observer. The lamp is mounted in the chamber 19 by means of gripping members 25 and 26, controlled by a set screw having an external knurled head 27. A plate 28 may be removed for renewal of the lamp. By releasing the pressure of set screw 27, the lamp may be moved up and down, to bring the filament 24 to the required point in the image. The apparatus up to this point is not peculiar to this invention.

Rotatably mounted in the chamber 6 is a circular member 30 having a lateral extension 31. The member 30 is mounted in a bearing formed by a supporting plate 32. The stem 31 is mounted in a bore in extension 33 on the plate member 5. Therefore the member 30 and its stem are freely rotatable, but are held in fixed position otherwise. A pointer 34 is fixed on the stem 31, as is also an external hand piece 35, by which the stem 31 may be rotated by the observer. The upper part of the member 30 is slotted to receive a transverse member 36, which forms the base of a surrounding frame 37, for an absorption wedge 40 below described.

This absorption wedge is semi-circular in form, and is composed of two pieces of glass one of which 40a is of a neutral color, the other 40b being clear. The two pieces of glass composing the wedge are of symmetrical shape. They are of uniformly tapered thickness from one end of the diametric edge to the other end thereof; the thickness being the same in either of the glasses at any point of any perpendicular to the diametric edge. For example, Fig. 3 represents as to thickness either a plan or an underplan view of wedge 40. Any horizontal section would show the same thickness at similar points. Their shape is exactly as if a semi-circle of solid glass as illustrated in Figs. 2 and 3 were stood on edge, as shown in Fig. 3, and cut in two by a diagonal vertical plane, such as that indicated by the dividing line of Fig. 3. The two parts are cemented together, and form a composite absorption screen, or wedge, which varies uniformly in its light absorbing effect from substantially zero at the extreme right hand corner to substantially one hundred per cent at the extreme left hand corner.

Small rubber packing members 41 may be provided at various points between the frame 37 and the wedge 40.

A calibrated scale 42 is attached to the outer face of the casing member 5, and this scale may be so calibrated that direct readings of temperature may be taken therefrom, the movement of the pointer 34 on the scale, effectively indicating the intensity of the received light, and therefore the heat of the object being examined.

The operation of the device is as follows: The instrument is either held in the hands of the observer, or else mounted on any suitable support, in position to direct the telescope at the incandescent object the heat of which is to be measured. The filament 24 is situated directly in the path of the light ray received from the object, and the filament will therefore appear in the middle portion of the image as presented to the eye of the observer. The color screen 16 renders all light received by the observer of the same color, and therefore all comparisons are a matter of intensity of light, and not of color.

It will be understood that the intensity of light derived from the filament 24 is predetermined, fixed, and constant. This fixed source of light is ordinarily of low intensity, so that the light from the object being observed will be of greater intensity than the light from the lamp. Therefore the filament will normally show as a dark line in the middle of the image of the heated object. When the absorption wedge 40 is turned by means of hand piece 35 as far to the left as possible the observer receives light from the incandescent object through that portion of the absorption wedge indicated by a circle A in Fig. 4. At this point there is a negligible amount of absorption by the wedge, because at that place the thickness of the neutral tinted glass is very slight. The observer then turns the hand piece 35 clockwise, thus increasing the thickness of the absorbing portion of the wedge, until the light received from the object is reduced to the same intensity as that from the filament 24. When this condition has been reached, the filament will no longer be visible, but will merge completely into the image received through lens 9. Then the pointer 34 will indicate on the scale 42 the temperature of the object being measured. If the wedge is turned too far the filament will again show, this time as a light line on a darker field.

Referring to Fig. 4, the portion of the absorption wedge through which light from the object is received is diagrammatically indicated by the circles A, B, C and D, and the path between by dotted lines, the circles indicating different positions of the absorbing wedge relative to the eye piece.

This form of absorption wedge has many advantages. For example, it permits more variation in the absorbing member for a given space, than would be possible if the member were a straight wedge moved in a straight line across the path of the light.

Furthermore, it provides an absorbing member in a much stronger form, and permits a more secure and accurate mounting. The circular form readily lends itself to the application of a direct temperature reading pointer and scale. Also, it is easier to grind pieces of glass for making up such a member, of the required thinness, and with the required accuracy, where large pieces may be used. Other objects will be apparent to those familiar with the art.

I claim:

1. In an optical pyrometer for measuring temperature of an incandescent object by comparison of light intensities, an absorption wedge in the form of a segment which is of uniform thickness throughout any normal to its bounding chord.

2. In an optical pyrometer, an absorption wedge in the form of a segment which gradually and uniformly increases in thickness throughout all planes parallel to its bounding chord mounted to turn on its center as an axis, the portion near the circumference cutting a light beam to be measured.

3. In an optical pyrometer, an absorption wedge in the form of a segment which is of uniform thickness throughout any normal to its bounding chord, the absorbing properties of the wedge being graduated around the arc edge thereof.

4. In an optical pyrometer, an absorption wedge for varying the intensity of a beam of light, the wedge being composed of two semi-circular segments of glass cemented together, one of the glasses being of a neutral color and of graduated thickness about the round edge.

5. In an optical pyrometer, an absorption wedge adapted to vary the intensity of a beam of light comprising a segmental wedge which is of uniform thickness throughout any normal to its bounding chord of varying thickness about the round edge, the wedge being centrally mounted to intercept the beam of light at a point near its circumference, and calibrated means to indicate the intensity of the light absorbed.

6. In an optical pyrometer, an absorption wedge in the form of a segment which gradually and uniformly varies in thickness throughout all planes except those normal to its bounding chord.

7. In combination with an optical pyrometer, an absorption wedge for light beams comprising two semi-circular segments of glass fastened together to form a semi-circular segment of uniform thickness, each of said segments when standing on their diametrical edge as a base being of the same thickness on any vertical line, but being of uniformly changing thickness from edge to edge on any horizontal line, the thickness varying from substantially zero at one end of the diameter to the thickness of the whole wedge at the other end of the diameter, the two segments being fitted together in overlapping position with their respective thick and thin portions in contact.

8. In an optical pyrometer, an absorption wedge for varying the intensity of a beam of light, the wedge being composed of two similar semi-circular segments of glass cemented together, one of the glasses being of a neutral color and of graduated thickness about the round edge, the combined thickness of the two segments being uniform throughout.

9. An optical pyrometer comprising a chamber, a shaft journalled in the wall of the chamber and provided with a hub within the same, a frame fixed in the hub, a translucent absorption wedge in the form of a segment mounted in said frame, one wall of the chamber being provided with an opening for the admission of light from the object whose temperature is to be determined, a compartment adjacent the chamber, a light of constant intensity in the compartment, the opposite walls of the compartment being provided with apertures in alignment with the light, the peripheral portion of the absorption wedge and said opening, a pointer on the shaft and a scale adjacent the pointer calibrated to indicate the temperature of said object.

10. In an optical pyrometer, the combination of a translucent segmental absorbing wedge which gradually and uniformly varies in thickness throughout all planes oblique to its bounding chord mounted on a fixed central shaft, an opening for the admission of a beam of light at one side of the wedge the edge of the wedge being disposed in the path of the beam of light received by the pyrometer, a fixed source of light at the opposite side of the wedge, an external pointer on the said shaft, and a calibrated scale adjacent thereto to indicate the intensity of the light received in comparison with the light from the fixed source.

In testimony whereof, I have hereunto set my hand.

EDWIN H. FISHER.

Witnesses:
ALICE A. TRILL,
HOWARD L. SNIVELY.